(No Model.) 3 Sheets—Sheet 1.

O. H. ORDWAY.
DOWEL MAKING MACHINE.

No. 603,965. Patented May 10, 1898.

Witnesses.
Lauritz N. Möller
William W. Lummus

Inventor.
Oscar H. Ordway.
by Alban Andrén his atty.

(No Model.)   3 Sheets—Sheet 2.

O. H. ORDWAY.
DOWEL MAKING MACHINE.

No. 603,965.   Patented May 10, 1898.

Witnesses
Lauritz N. Möller
William W. Lummus

Inventor.
Oscar H. Ordway
by Alban Andrew his atty (No Model.) 3 Sheets—Sheet 3.

O. H. ORDWAY.
DOWEL MAKING MACHINE.

No. 603,965. Patented May 10, 1898.

Witnesses.
Lauritz N. Möller
William W. Lummus

Inventor.
Oscar H. Ordway
by Alban Andrew
his atty

THE NORRIS PETERS CO., PHOTO-LITHO., WASHINGTON, D. C.

UNITED STATES PATENT OFFICE.

OSCAR H. ORDWAY, OF SOUTH FRAMINGHAM, MASSACHUSETTS, ASSIGNOR TO ALBERT H. ORDWAY, OF SAME PLACE.

DOWEL-MAKING MACHINE.

SPECIFICATION forming part of Letters Patent No. 603,965, dated May 10, 1898.

Application filed April 5, 1897. Serial No. 630,668. (No model.)

*To all whom it may concern:*

Be it known that I, OSCAR H. ORDWAY, a citizen of the United States, and a resident of South Framingham, in the county of Middlesex and State of Massachusetts, have invented new and useful Improvements in Dowel-Making Machines, of which the following, taken in connection with the accompanying drawings, is a specification.

This invention relates to improvements in dowel-making machines; and it consists, essentially, in the arrangement of a guide between the rotary cutter-head and the leading feed-rollers for the purpose of holding and guiding particularly small and slender dowel-blanks during the shaping operation, and thus preventing the twisting off of such blanks or dowels after their ends have passed from between the leading feed-rollers; and my invention also relates to improvements in the tail end of the hollow spindle or dowel-guide, the same consisting in providing said hollow spindle at its tail or delivery end with a tapering or conical extension adapted to project close up to and between the back feed-rollers, so as to properly guide such dowels into the annular grooves of said feed-rollers, and thereby preventing the dowels from passing above or below such feed-rollers, as will hereinafter be more fully shown and described, reference being had to the accompanying drawings, wherein—

Figure 1:
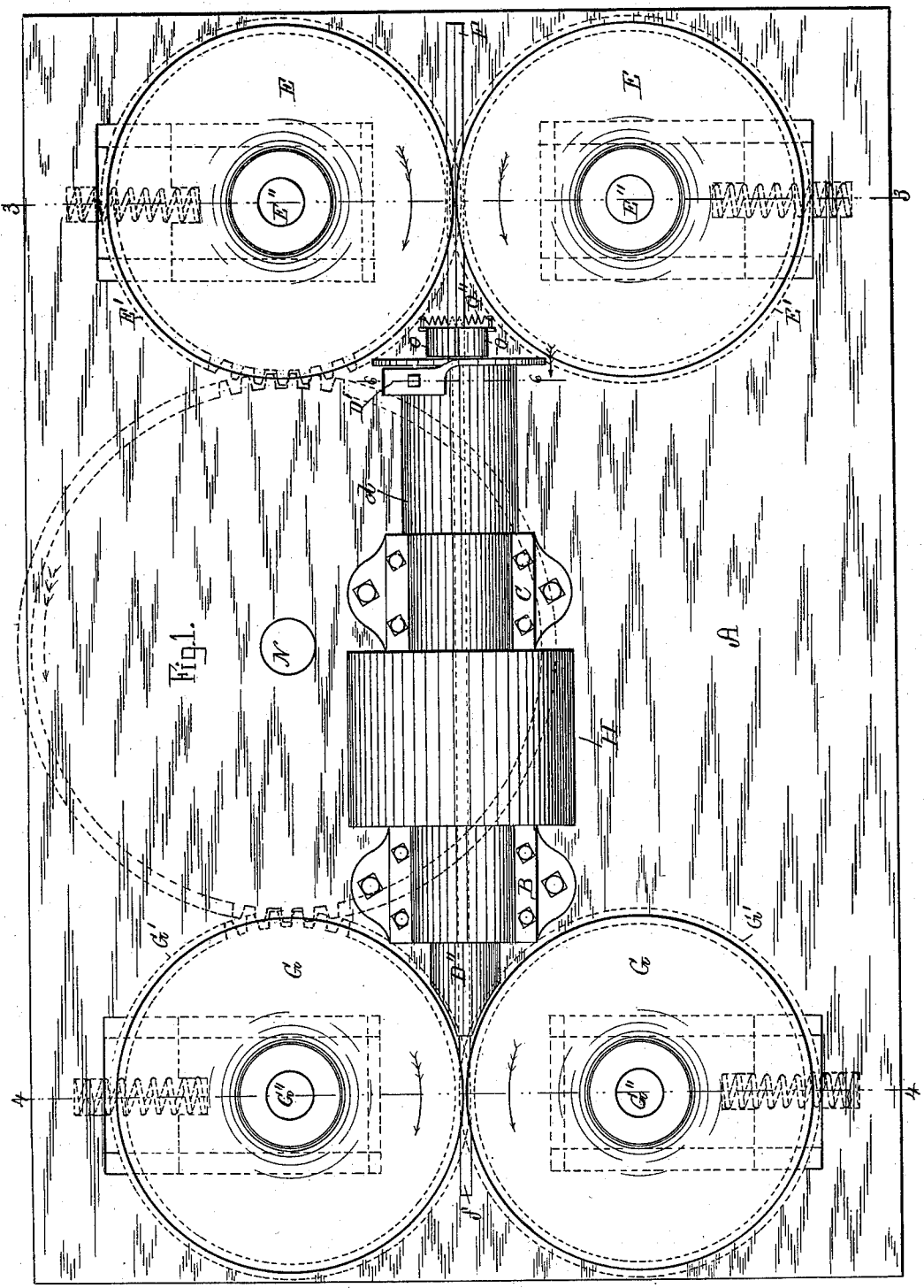
Figure 2:
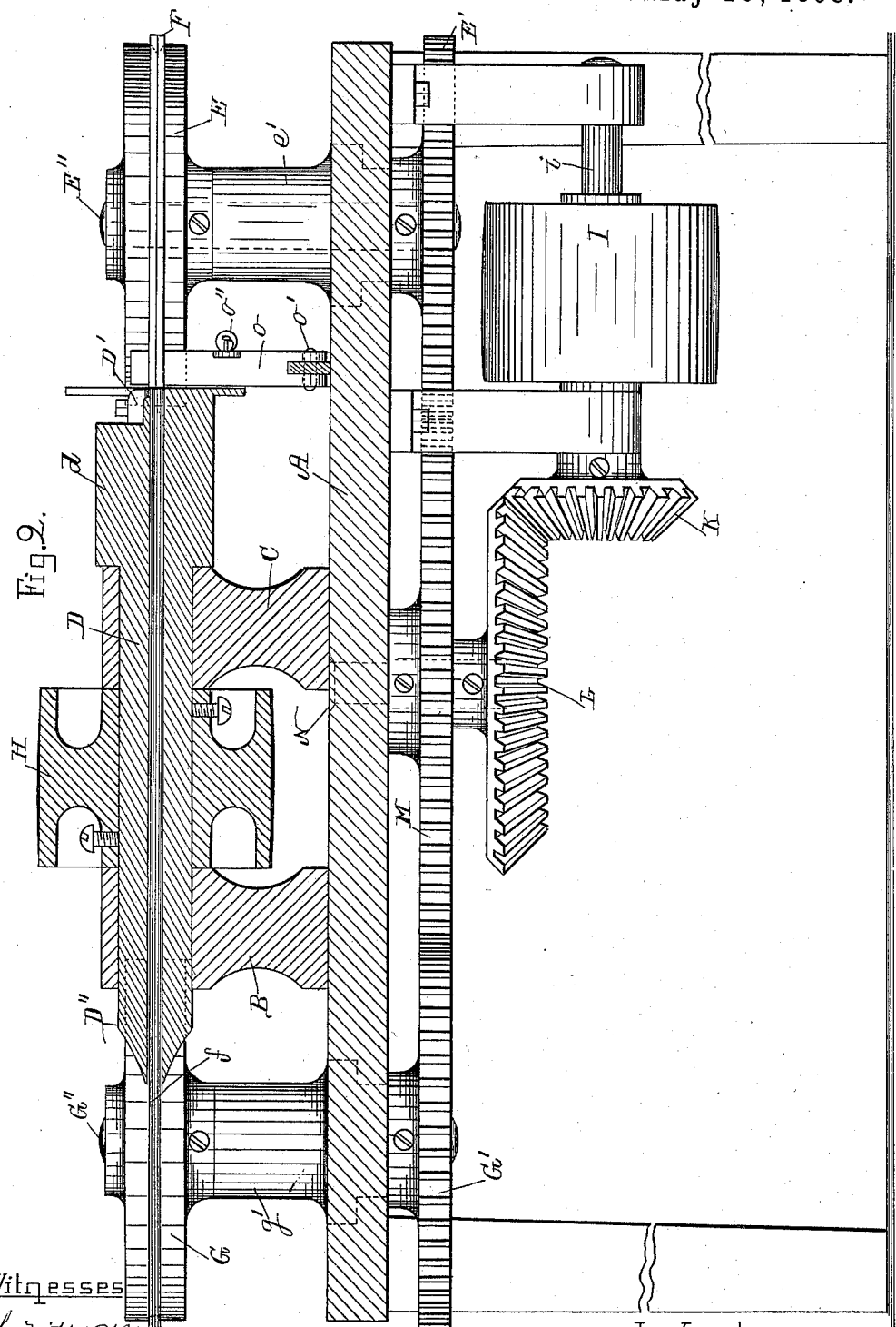
Figure 4:
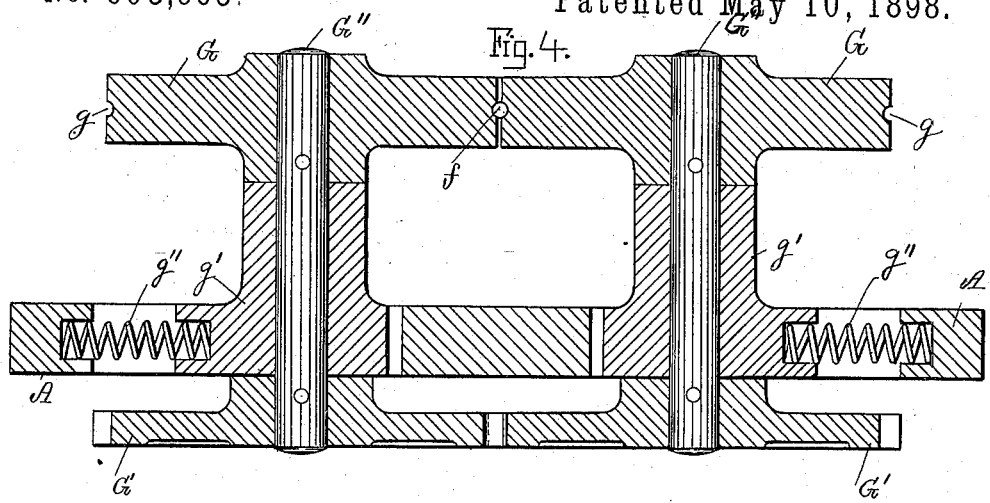
Figure 3:
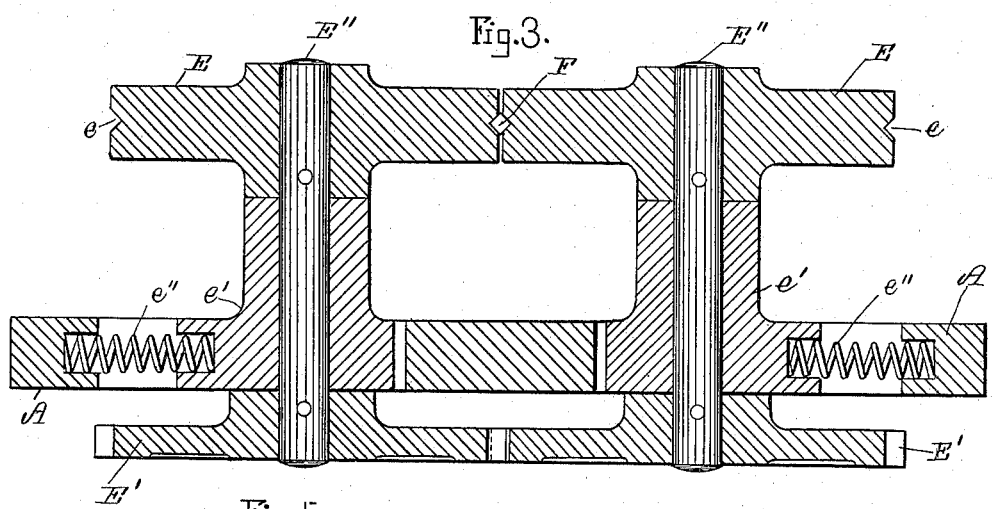
Figure 5:
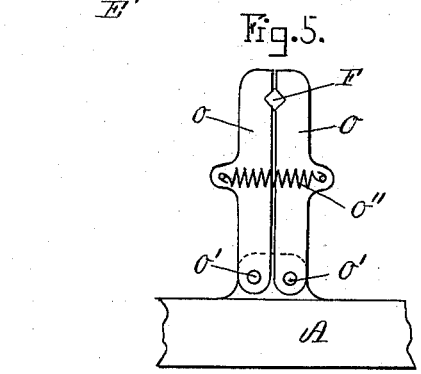
Figure 6:
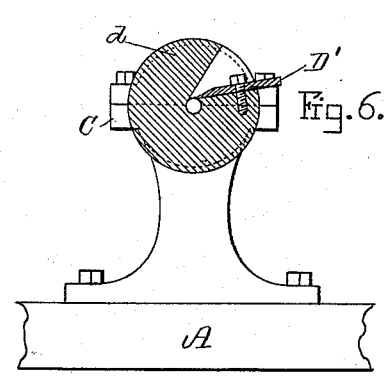

Figure 1 represents a top plan view of a dowel-making machine provided with my improvements. Fig. 2 represents a central longitudinal section of the same. Fig. 3 represents a cross-section of the head rollers on the line 3 3, shown in Fig. 1. Fig. 4 represents a cross-section of the back rollers on the line 4 4, shown in Fig. 1. Fig. 5 represents a detail end elevation of the guide for the dowel-blank arranged in front of the rotary cutter-head; and Fig. 6 represents a cross-section on the line 6 6, shown in Fig. 1.

Similar letters refer to similar parts wherever they occur on the different parts of the drawings.

In the drawings is represented an ordinary dowel-making machine composed of a table or work-supporting plate A, to which are attached bearings B C, in which the rotary hollow guide-spindle D is journaled, as usual.

$d$ is the cutter-head at the receiving end of the tubular guide-spindle D, and D' is the cutter-blade adjustably secured to said cutter-head, as usual.

E E represent the rotary leading feed-rollers, each one having a peripheral V-shaped groove $e$ for receiving and feeding the square dowel-blank F to the cutter-head, as usual.

G G represent the rotary back feed-rollers, each one having a semicircular peripheral groove $g$ for receiving and feeding the finished cylindrical dowel $f$ onward after the rear end has passed by the leading feed-rollers E E, as is common in devices of this kind.

H is a pulley on the hollow spindle D, to which a rotary motion is imparted by belt-power, as usual.

The feed-rollers E E are geared together by means of spur-gears E' E', attached to their shafts E'' E'', as shown.

The feed-rollers G G are likewise geared together by means of spur-gears G' G', attached to their shafts G'' G'', as usual.

In machines of this kind the rotary motion is imparted to the feed-rollers E E G G preferably by means of belt-power applied to a pulley I, attached to a shaft $i$, journaled in bearings attached to the table A and provided with a bevel-pinion K, the teeth of which mesh in a bevel-gear L, to which is attached a spur-gear M, the teeth of which mesh in one of the gears E and G, as shown.

The bevel-gear L and spur-gear M are shown in the drawings as being journaled on a spindle N, secured to the table A. I wish to state, however, that I do not confine myself to any particular means or mechanism for imparting a rotary motion to the hollow spindle D and the feed-rollers, as this may be done in any well-known manner without departing from the spirit of my invention.

In devices of this kind the leading feed-rollers E E have their shafts E'' journaled in sliding bearings $e'$ $e'$ and provided with springs $e''$ $e''$ for forcing the said rollers, with proper frictional contact, against opposite sides of the dowel-blank. $g'$ $g'$ are similar sliding bearings for the feed-roller shafts G'', and $g''$ $g''$ are springs for forcing the feed-rollers G G against opposite sides of the finished dowel.

In combination with a dowel-making machine of the above kind, in which a rotary cutter-head, guide-tube, and feed-rollers are employed, I use a guide for the dowel-blank, which guide is located close up to the cutter-head and between the latter and the leading feed-rollers, as shown. In practice I prefer to make such guide in the form of a pair of jaws O O, having V-shaped grooves in their upper ends for receiving the dowel-blank and preferably pivoted at $O'$ $O'$ in their lower ends to the table A and provided with a spring $O''$ for automatically holding the said grooved jaws against the dowel-blank as the latter is fed onward; but I wish to state that, if so desired, said dowel-guide may be made in a single piece with a guide perforation in its upper end for guiding and receiving the dowel-blank as it is being fed forward to the cutter and guide-tube. By this arrangement the dowel-blank is held from being twisted after its end has passed entirely by the leading feed-rollers E E, thus preventing the dowel from being twisted off or broken after its end has passed from between said leading feed-rollers. This is very desirable in making small dowels—such, as for instance, those of one-fourth of an inch in diameter and less.

I also use, in combination with a dowel-making machine of the kind above mentioned, an externally-tapering hollow guide-tube extension $D''$, forming a continuation of the rear end of the hollow guide-tube D, which extension $D''$ is made to project as far as possible between the back-rollers G G without touching the latter, and such extension serves to properly guide the end of the finished dowel into the grooves of the rollers G G, thus preventing said dowel from passing above or below said rollers or to be crushed between them, as would frequently be the case, particularly if the dowel should come out bent or crooked.

The operation is as follows: The dowel-blank F is introduced between the leading grooved rotary feed-rollers E E and fed onward through the guide O to the rotary cutter and cutter-head, where the dowel is shaped and finished and forced onward through the guide-tube or hollow spindle D and out through the externally-tapering guide-tube extension $D''$, by which the finished dowel is properly conducted between the grooved rear feed-rollers G G, thus preventing the dowel-blank from being twisted after leaving the leading feed-rollers and also causing the finished end of the dowel to be properly conducted between the grooved rear feed-rolls, as hereinabove set forth.

Having thus fully described the nature, construction, and operation of my invention, I wish to secure by Letters Patent and claim—

In a dowel-making machine, the combination with leading feed-rollers having angularly-grooved peripheries for feeding a square dowel-blank, of the rotary hollow spindle arranged in bearings in rear of the feed-rollers and having a rearwardly-tapered delivery end, a cutter-head fixed on the forward end of the rotary spindle and carrying an adjustable cutter arranged to rotate circumferentially about the square blank and reduce it to cylindrical form, delivery-rollers having semicircular grooved peripheries for grasping the round dowel, the tapering delivery end of the spindle extending between the grooves of the delivery-rolls, and a guide for the blank arranged between the feed-rolls and cutter-head and in close proximity to the latter, said guide consisting of two yielding and expansible jaws having angular recesses on their inner adjacent sides each corresponding to one-half the sectional shape of the square blank and operating to hold the latter against the twisting action of the cutter-head, substantially as described.

In testimony whereof I have signed my name to this specification, in the presence of two subscribing witnesses, on this 3d day of April, A. D. 1897.

OSCAR H. ORDWAY.

Witnesses:
ALBAN ANDRÉN,
LAURITZ N. MÖLLER.